United States Patent

Kotera et al.

[15] 3,665,190

[45] May 23, 1972

[54] MOS-FET INFRARED DETECTOR

[72] Inventors: Nobuo Kotera, Kokubunji; Yoshifumi Katayama, Hachioji, both of Japan

[73] Assignee: Hitachi, Ltd., Tokyo, Japan

[22] Filed: Sept. 11, 1970

[21] Appl. No.: 71,479

[30] Foreign Application Priority Data

Sept. 16, 1969 Japan....................................44/72743

[52] U.S. Cl. ..................250/83.3 H, 250/83.3 R, 250/211 J, 307/304

[51] Int. Cl............................................................G01t 1/24

[58] Field of Search.......................250/83.3 R, 83.3 H, 211 J; 307/304

[56] References Cited

UNITED STATES PATENTS

| | | | |
|---|---|---|---|
| 3,544,864 | 12/1970 | Richman | 307/304 X |
| 2,957,081 | 10/1960 | Chapman | 250/83.3 R |
| 3,457,409 | 7/1969 | Shenker et al. | 250/83.3 H |

*Primary Examiner*—Archie R. Borchelt
*Attorney*—Craig, Antonelli & Hill

[57] ABSTRACT

An electromagnetic wave detecting element which employs an MOS type field effect device as an element for detection to enable the response time to be as short as $10^{-7}$ sec or less as compared to the conventional response of $10^{-3}$ sec. Electromagnetic waves for detection are directed to the surface of the MOS device opposite to the surface on which electrodes are provided.

7 Claims, 2 Drawing Figures

INVENTORS

NOBUO KOTERA

YOSHIFUMI KATAYAMA

BY Craig, Antonelli, Stewart & Hill

ATTORNEYS

MOS-FET INFRARED DETECTOR

BACKGROUND OF THE INVENTION

1. Field of the Invention

The present invention relates to an electromagnetic wave detecting element, and more particularly to an electromagnetic wave detecting element employing the surface layer of a semiconductor body.

2. Description of the Prior Art

Heretofore, Golay cells, pyroelectric detectors, etc. have been employed for detecting electromagnetic waves in the long wavelength region such as millimeter waves and far infrared rays. However, the response time of these detectors is long, for example, of the order of $10^{-3}$ sec.

Recently, it has been attempted to employ germanium doped with gold or copper as a bolometer, but the response time of the germanium bolometer also is difficult to be made shorter than those of conventional detectors.

SUMMARY OF THE INVENTION

An object of the present invention is to provide an element for quickly detecting electromagnetic waves.

The present invention is based on the discovery by the inventors that when electromagnetic waves are directed onto the surface of an MOS type field effect transistor made of a semiconductor of group IV element or intermetallic compound at which electrons are collected by the application of a voltage to the transistor, the electrical conductivity of the semiconductor varies. Thus, by detecting the variation in the electrical conductivity the electromagnetic waves directed to the transistor can be detected. The variation in the conductivity of the semiconductor due to irradiation by electromagnetic waves is of the order of $10^{-7}$ sec.

DESCRIPTION OF THE PREFERRED EMBODIMENT

Figure 1:
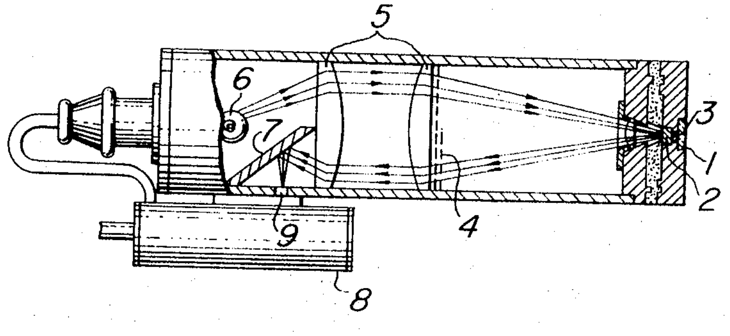
FIG. 1 PRIOR ART
FIG. 1 is a partial cross-sectional view of a conventional electromagnetic wave detector.

One of the conventional electromagnetic wave detectors is a Golay cell the structure of which is shown in FIG. 1. When electromagnetic waves (infrared rays) to be detected having passed through an electromagnetic wave transmissive window 1 are absorbed by an electromagnetic wave absorption film 2, Xenon gas in the Golay cell expands depending on the temperature rise of the absorption film 2.

On the other hand, rays of light emitted by a lamp 6 and having passed through a condenser lens system 5 are reflected by a flexible mirror 3 provided in close proximity to the absorption film 2, and then after having passed through a grid 4 and the condenser lens system 5, are reflected by a mirror 7 to a photo-tube 8 through a slit 9. At this time, as shown in FIG. 1, an image of the lower half of the grid 4 is focussed at the slit 9 so that any displacement of the image results in a restriction of the quantity of light entering the photo-tube 8.

The image of the grid 4 is shifted depending on the intensity of the incident infrared rays through the displacement or deformation of the flexible mirror due to the expansion of the Xenon gas to vary the quantity of light introduced into the photo-tube 8. Consequently, the intensity of incident light can be detected by amplifying this variation. However, this process is accompanied by physical displacement, such as the absorption of the incident light, the gaseous expansion, displacement of the absorption film, and the deformation of the flexible mirror so that the time constant thereof is large, and is difficult for it to be less than of the order of $10^{-3}$ sec.

Figure 2:
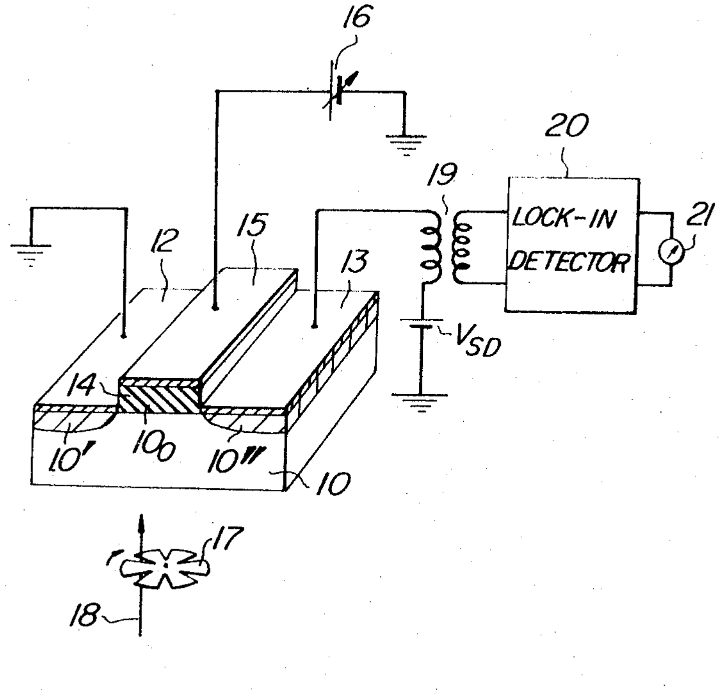
FIG. 2 is a schematic view for illustrating the principle of electromagnetic wave detection according to the present invention.

According to the device according to the present invention shown in FIG. 2, this disadvantage can be obviated.

Referring to FIG. 2, a p-type InSb substrate 10 is provided on its one principal surface with layers 10' and 10'' doped with an acceptor to a concentration of $10^{14}$ atoms/cm$^3$, which in turn are provided on their upper surfaces with metal electrodes 12 and 13, respectively. The doped layers 10' and 10'' act as source and drain regions, respectively. The principal surface of the substrate 10 is further provided at its central portion $\mathbf{10}_o$ with an oxide insulating layer 14 consisting of $In_2O_3 \cdot {}^{a0SiO}{}_2$ on which a gate electrode 15 is formed. The source electrode 12 is directly grounded, and the gate electrode 15 is connected to a grounded adjustable voltage source 16. The drain electrode 13 is grounded through the primary winding of a transformer 19 for leading out a signal and a current source $V_{SD}$. When a positive voltage of several tens of volts is supplied from the source 16 to the gate electrode 15, electrons are collected on the surface portion of the substrate 10 between the source region 10' and the drain region 10'' to form a so-called n-type inversion layer.

The electrons in the n-type inversion layer become hot due to the hot electron effect when they absorb electromagnetic waves. As a result, the electrical conductivity of the substrate changes. Consequently, when electromagnetic waves 18 are directed to the back surface of the substrate 10 through a chopper 17, the terminal voltage between the source and drain electrodes intermittently varies depending on the intensity of the incident intermittent electromagnetic waves. The variation in the terminal voltage is amplified by the transformer 19 and a lock-in detector 20 synchronized with the frequency (for example 10 Hz) of the chopping by the chopper 17, and is detected by an indicator 21.

In the above example, a p-type InSb was employed as an intermetallic semiconductor. However, other group III–V compound semiconductors can also be employed.

If a number of MOS field effect transistors according to the invention which can be used as electromagnetic wave detectors are formed into an integrated circuit, pattern recognition, measurement of the spatial distribution of the intensity of electromagnetic radiation, etc. can be effected. If the MOS field effect transistors according to the invention are formed into an integrated circuit together with MOS field effect transistors for amplification and impedance conversion, signal amplification and selection of the order of signal reading can be effected. In either case, the response time of the device according to the present invention is shorter than about $10^{-7}$ sec which is shorter by several orders of magnitude than when using the conventional Golay cells and germanium bolometers.

We claim:

1. An electromagnetic wave detecting device comprising an MOS field effect transistor, means for applying a voltage to the gate electrode of said MOS field effect transistor, and means for applying a d.c. voltage between the source and drain electrodes of said MOS field effect transistor, said transistor being adapted to receive electromagnetic waves to be detected from the surface opposite to the surface on which said source, drain and gate electrodes are disposed.

2. An electromagnetic wave detecting device according to claim 1, comprising a chopper disposed in front of said transistor for interrupting incident electromagnetic waves and a transformer and lock-in detector connected to said drain electrode for amplifying the output signal of said transistor.

3. A method of detecting electromagnetic waves, particularly those in the long wavelength region such as millimeter waves and far infared rays, comprising the steps of:

disposing an MOS field effect transistor having a semiconductor substrate of one conductivity type, a gate electrode disposed through an insulating layer on the central portion of one major surface of said substrate, a source and drain electrode each being disposed on one major surface at opposite sides of said central portion, and means for applying a voltage to said gate electrode with means for applying a D.C. voltage between said source and drain electrodes in the path of an electromagnetic wave, so that said electromagnetic wave impinges on said semiconductor substrate and measuring the terminal voltage between the source and drain electrodes so as to provide an indication of the intensity of the incident electromagnetic waves impingent upon said MOS field effect transistor.

4. An electromagnet wave detecting device comprising first means for receiving electromagnetic waves to be detected; and second means, responsive to the impingement of electromagnetic waves on said first means, for generating an electrical signal corresponding to the intensity of said received electromagnetic waves; wherein said first means comprises a first surface of an MOS field effect transistor, and said second means comprises terminals attached to the source and drain electrodes of said MOS field effect transistor which, together with the gate electrode of said MOS field effect transistor, are disposed on the principle surface of said MOS field effect transistor opposite said first surface, said MOS field effect transistor further including a voltage source connected to said gate electrode and a means for applying a D.C. voltage between said source and drain electrodes thereof.

5. A device according to claim 4, further comprising third means for interrupting the electromagnetic waves incident upon said first means including a rotatable chopper and further including a transformer and a lock-in detector connected to the terminal which is connected to said drain electrode for amplifying said electrical signal.

6. A device according to claim 4, wherein said voltage source connected to said gate electrode is variable.

7. A device according to claim 4, wherein said substrate further includes an oxide layer of $In_2O_3 \cdot SiO_2$ on which said gate electrode is formed, said substrate being a p-type InSb substrate, on said principle surface of which beneath said source and drain layers an acceptor impurity is doped.

* * * * *